US008376830B2

(12) United States Patent
Nguyen

(10) Patent No.: US 8,376,830 B2

(45) Date of Patent: Feb. 19, 2013

(54) GAMING SYSTEM AND METHOD OF GAMING

(75) Inventor: Hung Ngoc Nguyen, Sefton (AU)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 727 days.

(21) Appl. No.: 12/257,908

(22) Filed: Oct. 24, 2008

(65) Prior Publication Data

US 2009/0156283 A1 Jun. 18, 2009

(30) Foreign Application Priority Data

Oct. 26, 2007 (AU) ................................ 2007905888

(51) Int. Cl.
*A63F 13/00* (2006.01)

(52) U.S. Cl. ................................ 463/20; 463/16; 463/17

(58) Field of Classification Search .................... 463/16, 463/17, 20, 25, 43
See application file for complete search history.

(56) References Cited

U.S. PATENT DOCUMENTS

| | | | | |
|---|---|---|---|---|
| 6,935,947 | B1 * | 8/2005 | Singer et al. | 463/16 |
| 2002/0034974 | A1 * | 3/2002 | Wood et al. | 463/13 |
| 2003/0060276 | A1 * | 3/2003 | Walker et al. | 463/25 |
| 2004/0053673 | A1 * | 3/2004 | Mishra | 463/20 |
| 2006/0154717 | A1 * | 7/2006 | Jackson | 463/20 |
| 2008/0045302 | A1 * | 2/2008 | Low | 463/20 |

FOREIGN PATENT DOCUMENTS

EP 1600904 11/2005

* cited by examiner

*Primary Examiner* — James S McClellan

(74) *Attorney, Agent, or Firm* — Hanley, Flight & Zimmerman, LLC

(57) ABSTRACT

A method of gaming comprising: (a) displaying a plurality of first symbols; (b) displaying a plurality of second symbols; (c) matching at least one of the first symbols to at least one of the second symbols; (d) removing each first symbol which is matched with the second symbols; and (e) replacing each removed first symbol with an additional first symbol to thereby display a modified plurality of first symbols.

50 Claims, 11 Drawing Sheets

| Winning Band Scorecard | |
|---|---|
| Matching Pattern | Prize |
| ■■■■■ | 50 |
| ■■■■ | 10 |
| ■■■ | 2 |

GAMING SYSTEM AND METHOD OF GAMING

CROSS-REFERENCE TO RELATED APPLICATIONS

The present application claims the benefit of priority to Australian Provisional Patent Application No. 2007905888, filed on Oct. 26, 2007, entitled "A GAMING SYSTEM AND METHOD OF GAMING", which is herein incorporated by reference in its entirety.

FIELD OF THE INVENTION

This invention relates to a gaming system, a method of gaming, a game controller and computer program code.

BACKGROUND OF THE INVENTION

Many different gaming systems are known in which symbols are displayed in order to provide a game on which a wager can be made. Typically such games are played on so-called "poker machines". Usually the symbols are displayed on a mechanical reel, or in more recent times on a video display. A winning game is determined based on the displayed symbols.

While such gaming systems provide users with enjoyment, a need exists for an alternative gaming system in order to maintain or increase player enjoyment.

SUMMARY OF THE INVENTION

In a first aspect, the invention provides a method of gaming including:

(a) displaying a plurality of first symbols;

(b) displaying a plurality of second symbols;

(c) matching at least one of the first symbols to at least one of the second symbols;

(d) removing each first symbol which is matched with the second symbols; and (e) replacing each removed first symbol with an additional first symbol to thereby display a modified plurality of first symbols.

In an embodiment, the method includes repeating steps (c), (d) and (e) until there are no further matches.

In an embodiment, the method includes:

(f) displaying a further plurality of second symbols; and (g) repeating steps (c), (d) and (e) in respect of the further plurality of second symbols with the modified plurality of first symbols.

In an embodiment, the first symbols are randomly generated.

In an embodiment, the first symbols are arranged as a band of symbols separate from the second symbols.

In an embodiment, the second symbols are randomly generated.

In an embodiment, each second symbol corresponds to one of a plurality of reels.

In an embodiment, at least three of the first symbols are matched with at least three of the second symbols before symbols are removed.

In an embodiment, each match corresponds to a win.

In an embodiment, the matching of the first and second symbols includes matching a number of the first symbols in sequence order with a number of the second symbols in sequence order.

In an embodiment, different winning ranges are provided for matching different numbers of first symbols with corresponding numbers of second symbols.

In an embodiment, the determination of a match is automatically assessed.

In an embodiment, player interaction to identify the matching symbols is required in order to identify a match.

In an embodiment, the second symbols are arranged in a plurality of rows and the step of matching is applied within each row.

In an embodiment, the second symbols are displayed at a plurality of display positions arranged in a plurality of rows and an order of display positions is defined, and wherein the step of matching is applied based on the order of the display positions such that matching can occur across rows.

In a second aspect, the invention provides a game controller for a gaming system, the game controller arranged to:

(a) display a plurality of first symbols;

(b) display a plurality of second symbols;

(c) match at least one of the first symbols to at least one of the second symbols;

(d) remove each first symbol which is matched with the second symbols; and (e) replace each removed first symbol with an additional first symbol to thereby display a modified plurality of first symbols.

In an embodiment, the game controller is arranged to repeat steps (c), (d) and (e) until there are no further matches.

In an embodiment, the game controller is arranged to:

(f) display a further plurality of second symbols; and (g) repeat steps (c), (d) and (e) in respect of the further plurality of second symbols with the modified plurality of first symbols.

In an embodiment, the game controller includes a random number generator.

In an embodiment, the game controller is arranged to randomly generate the first symbols with the random number generator.

In an embodiment, the game controller is arranged to randomly generate the second symbols with the random number generator.

In an embodiment, the first symbols are arranged as a band of symbols separate from the second symbols.

In an embodiment, each second symbol corresponds to one of a plurality of reels.

In an embodiment, at least three of the first symbols are matched with at least three of the second symbols before symbols are removed.

In an embodiment, each match corresponds to a win.

In an embodiment, the matching of the first and second symbols includes matching a number of the first symbols in sequence order with a number of the second symbols in sequence order.

In an embodiment, different winning ranges are provided for matching different numbers of first symbols with corresponding numbers of second symbols.

In an embodiment, the determination of a match is automatically assessed.

In an embodiment, player interaction to identify the matching symbols is required in order to identify a match.

In an embodiment, the second symbols are arranged in a plurality of rows and the game controller is arranged to apply matching within each row.

In an embodiment, the second symbols are displayed at a plurality of display positions arranged in a plurality of rows and an order of display positions is defined, and the game controller is arranged to apply matching based on the order of the display positions such that matching can occur across rows.

In an embodiment, the game controller is implemented, at least in part, by a processor executing program code stored in a memory.

In a third aspect, the invention provides a gaming system including:

a player interface including a display; and a gaming controller arranged to:

(a) display a plurality of first symbols on the display;

(b) display a plurality of second symbols on the display;

(c) match at least one of the first symbols to at least one of the second symbols;

(d) remove each first symbol which is matched with the second symbols; and (e) replace each removed first symbol with an additional first symbol to thereby display a modified plurality of first symbols on the display.

In an embodiment, the game controller is arranged to repeat steps (c), (d) and (e) until there are no further matches.

In an embodiment, the game controller is arranged to:

(f) display a further plurality of second symbols on the display; and (g) repeat steps (c), (d) and (e) in respect of the further plurality of second symbols with the modified plurality of first symbols.

In an embodiment, the gaming system includes a random number generator.

In an embodiment, the game controller is arranged to randomly generate the first symbols with the random number generator.

In an embodiment, the game controller is arranged to randomly generate the second symbols with the random number generator.

In an embodiment, the first symbols are arranged on the display as a band of symbols separate from the second symbols.

In an embodiment, each second symbol corresponds to one of a plurality of reels displayed on the display.

In an embodiment, at least three of the first symbols are matched with at least three of the second symbols before symbols are removed.

In an embodiment, each match corresponds to a win.

In an embodiment, the matching of the first and second symbols includes matching a number of the first symbols in sequence order with a number of the second symbols in sequence order.

In an embodiment, different winning ranges are provided for matching different numbers of first symbols with corresponding numbers of second symbols.

In an embodiment, the determination of a match is automatically assessed.

In an embodiment, the player interface includes an instruction input mechanism and the player is required to operate the instruction input mechanism to identify the matching symbols.

In an embodiment, the second symbols are arranged in a plurality of rows on the display and the game controller is arranged to apply matching within each row.

In an embodiment, the second symbols are displayed at a plurality of display positions arranged in a plurality of rows and an order of display positions is defined, and the game controller is arranged to apply matching based on the order of the display positions such that matching can occur across rows.

In an embodiment, the gaming system includes a processor and a memory storing program code which when executed implements the game controller.

In a fourth aspect, the invention provides computer program code which when executed implements the above method.

In a fifth aspect, the invention provides a computer readable medium including the above program code.

In a sixth aspect, the invention provides a data signal including the above program code.

In a seventh aspect, the invention extends to transmitting the above program code.

BRIEF DESCRIPTION OF DRAWINGS

Certain embodiments of the invention will be described, by way of example, with reference to the accompanying drawings in which.

Figure 1:
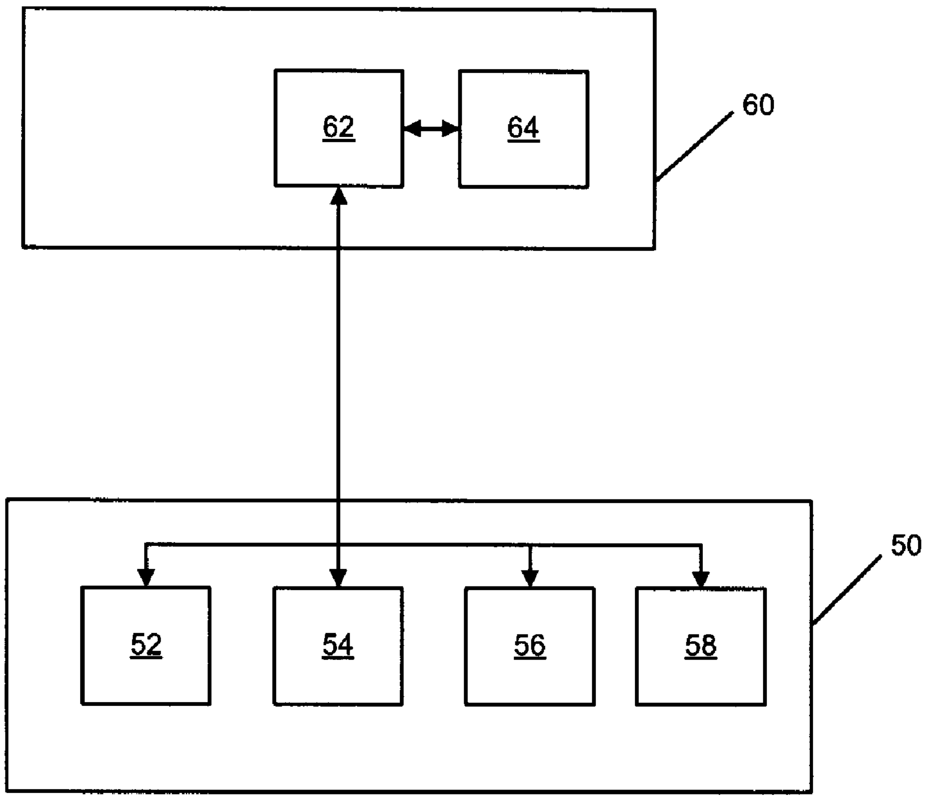
FIG. 1 is a block diagram of the core components of a gaming system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF EMBODIMENTS

Referring to the drawings, there is shown a gaming system arranged to implement a game. The gaming system can take a number of different forms.

In a first form, a stand alone gaming machine is provided wherein all or most components for implementing the game are present in a player operable gaming machine.

In a second form, a distributed architecture is provided wherein some of the components for implementing the game are present in a player operable gaming machine and some of the components for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
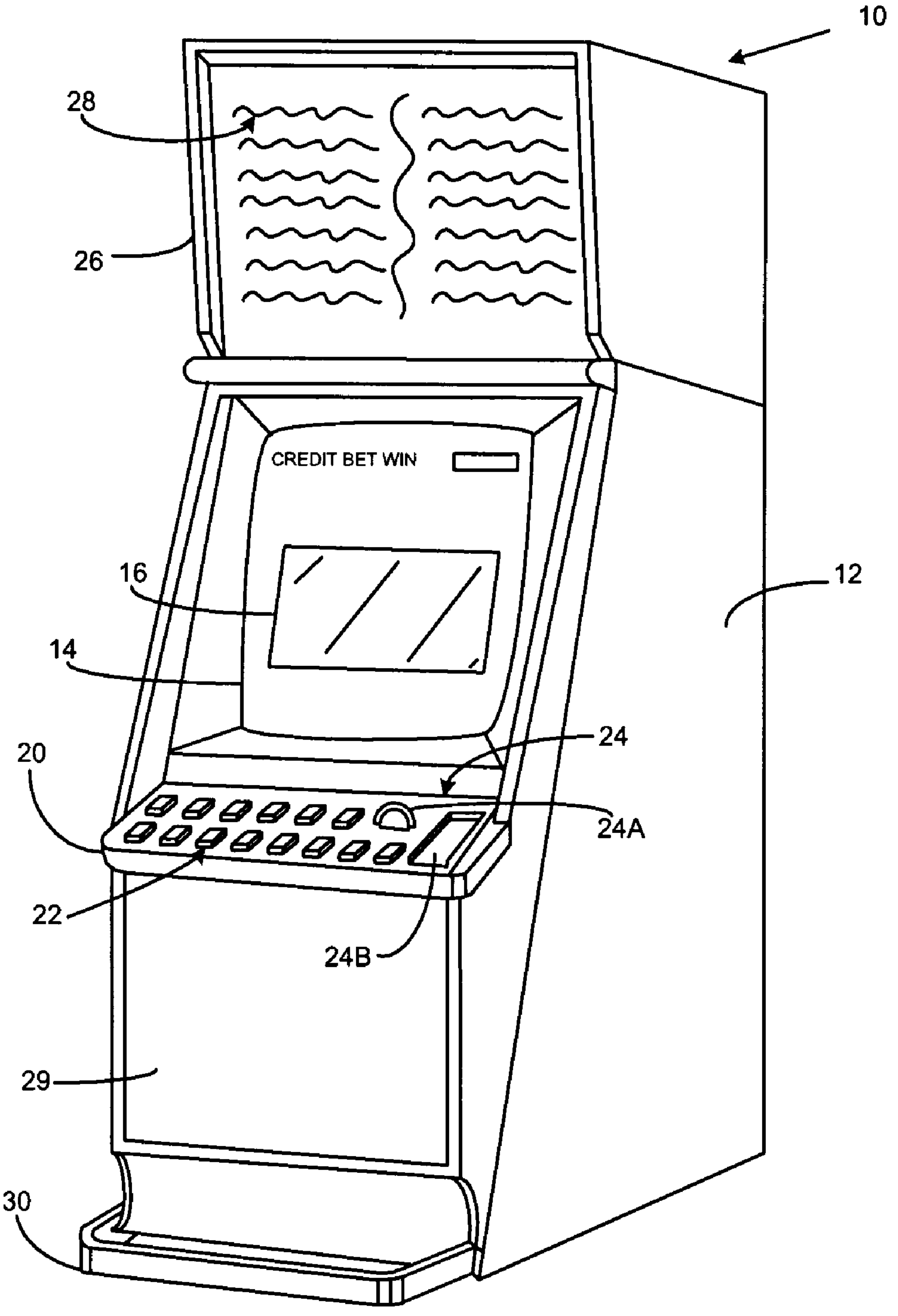
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
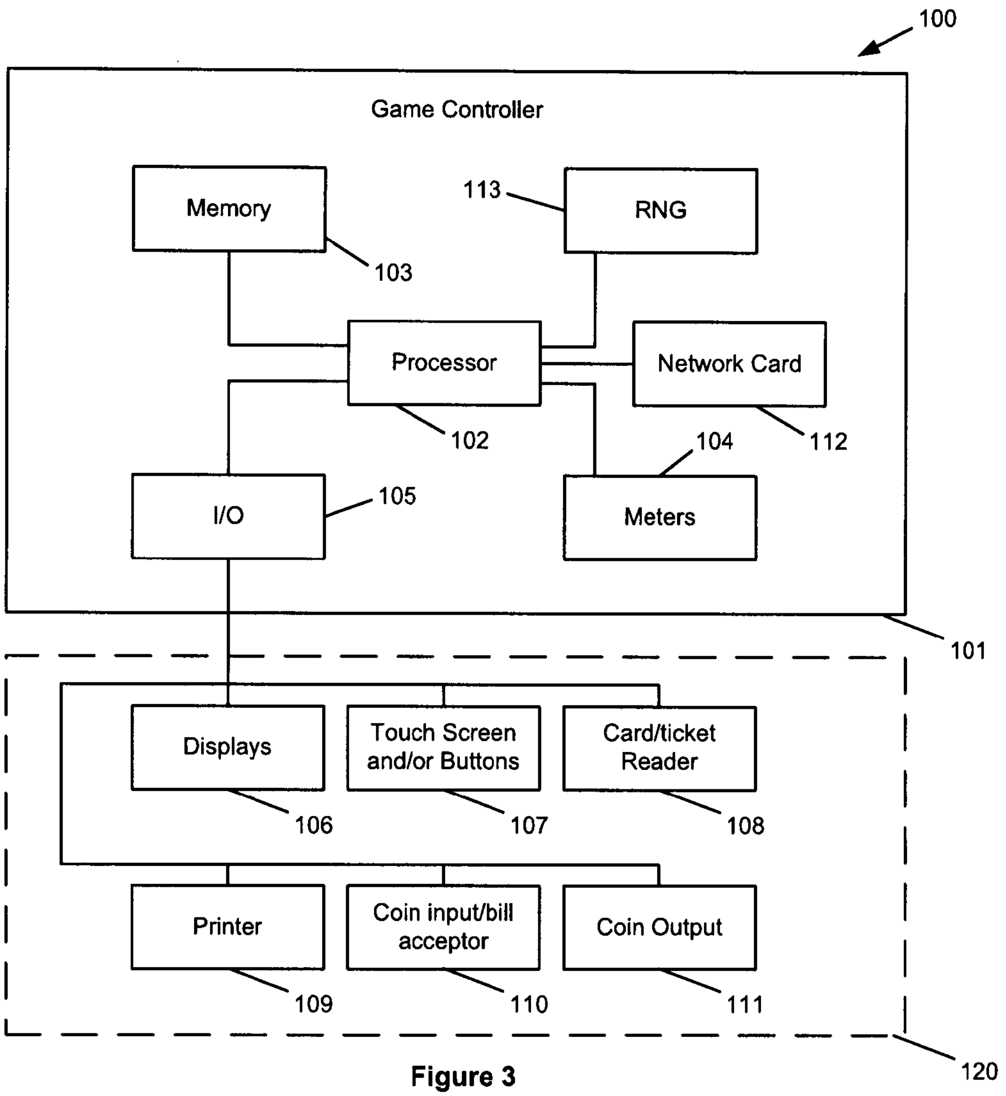
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 include one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted based upon the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
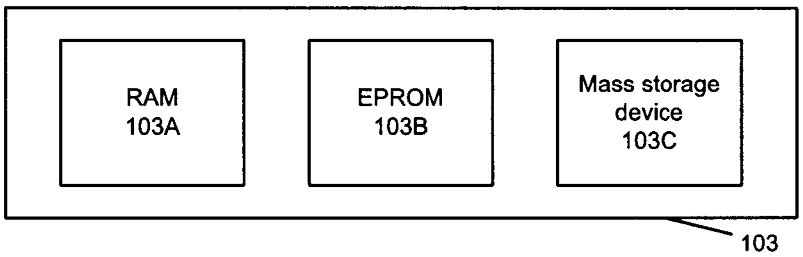
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
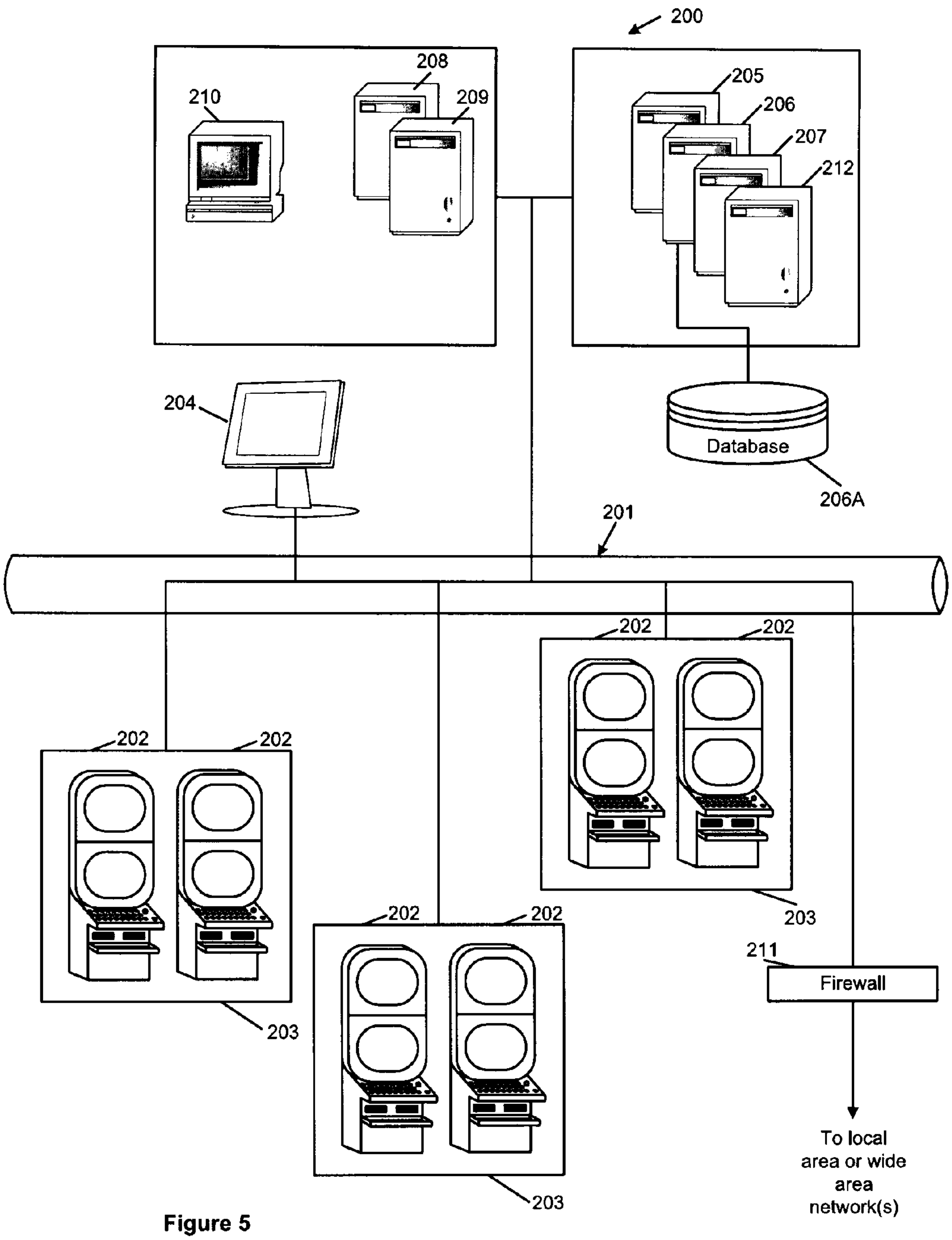
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games depending upon the terminals.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

Figures 6, 7:
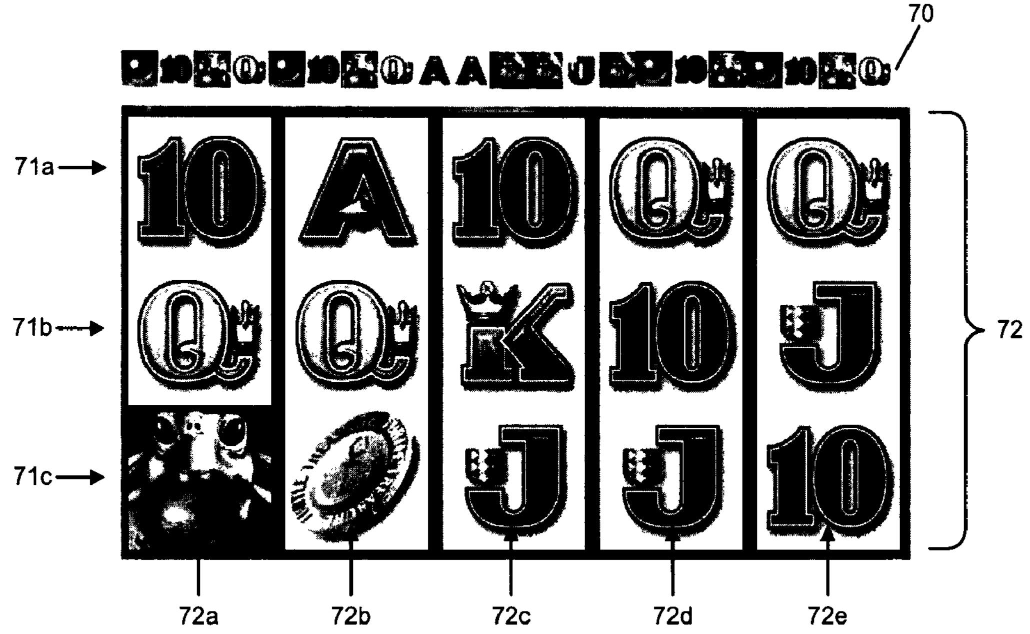
FIG. 6 is a view of a display of a gaming system according to an embodiment of the invention.
FIG. 7 is a table showing a score card used in an embodiment of the invention.

FIG. 6 shows a display of the gaming machine according to one embodiment of the invention. The display has a first plurality of symbols 70 and a second plurality of symbols 72. The first plurality of symbols ("first symbols") 70 are separate from the symbols 72 and include a band of symbols. The first symbols allow the playing of a game which is additional to the normal spinning reel game, accordingly it may only be available for certain bet types such as a maximum bet, for a special bet such as an ante bet or the first symbols may be added in response to a trigger, for example as part of a feature game. Other variations will be apparent to those skilled in the art.

The second plurality of symbols ("second symbols") 72 include a number of rows (three in the embodiments shown 71*a*, 71*b* and 71*c*) which are formed by virtual mechanical reels provided by a video display (but could be provided by mechanical reel). Thus, the second symbols 72 includes those on a first reel 72*a*, a second reel 72*b*, a third reel 72*c*, a fourth reel 72*d* and a fifth reel 72*e*.

The band of symbols 70 is randomly generated as are those on the reels 72*a* to 72*e*. There are a number of available techniques for selecting the first and second symbols. As the first symbols can be replaced as will be described in further detail below, one technique is to select the symbols at random from a set of available symbols sorted in memory 103. The second symbols can be selected using any of the known techniques for selecting symbols for a spinning reel type game. In one implementation there is a set of symbols for each reel stored in memory 103 such that it is possible to select the symbols by randomly selecting a stopping position in the sequence using the random number generator. In one example, three symbols of each of five reels may be displayed such that symbols are displayed at fifteen display positions on display 54. It is known to bias the stopping positions to thereby control the odds of the game. Other techniques can be used to control the odds of particular outcomes occurring to thereby control the return to player of the game. For example, it is known to randomly determine the outcome and then map the outcome to a symbol combination.

The symbols 70 may be generated on the first play of the game. The symbols may be modified at each play of the game.

The object of the game is to match a combination of the symbols in the bands 70 with those on one of the rows formed by the reels 72*a* to 72*e*. In the embodiment of the invention, at least three symbols in sequence shown in band 70 need to be displayed on a row 71*a*, 71*b* and 71*c* of the reels 72*a* to 72*e* in order for a win to occur.

FIG. 7 is a chart showing a score card which is predetermined and programmed into the gaming machine or gaming system which provides for the return of a wager depending on the number of matches which occurs.

For example, if three matches occur, three units of prize is won, if four matches occur, ten units of prize is won and if five matches occur, fifty units of prize is won.

Figure 17:
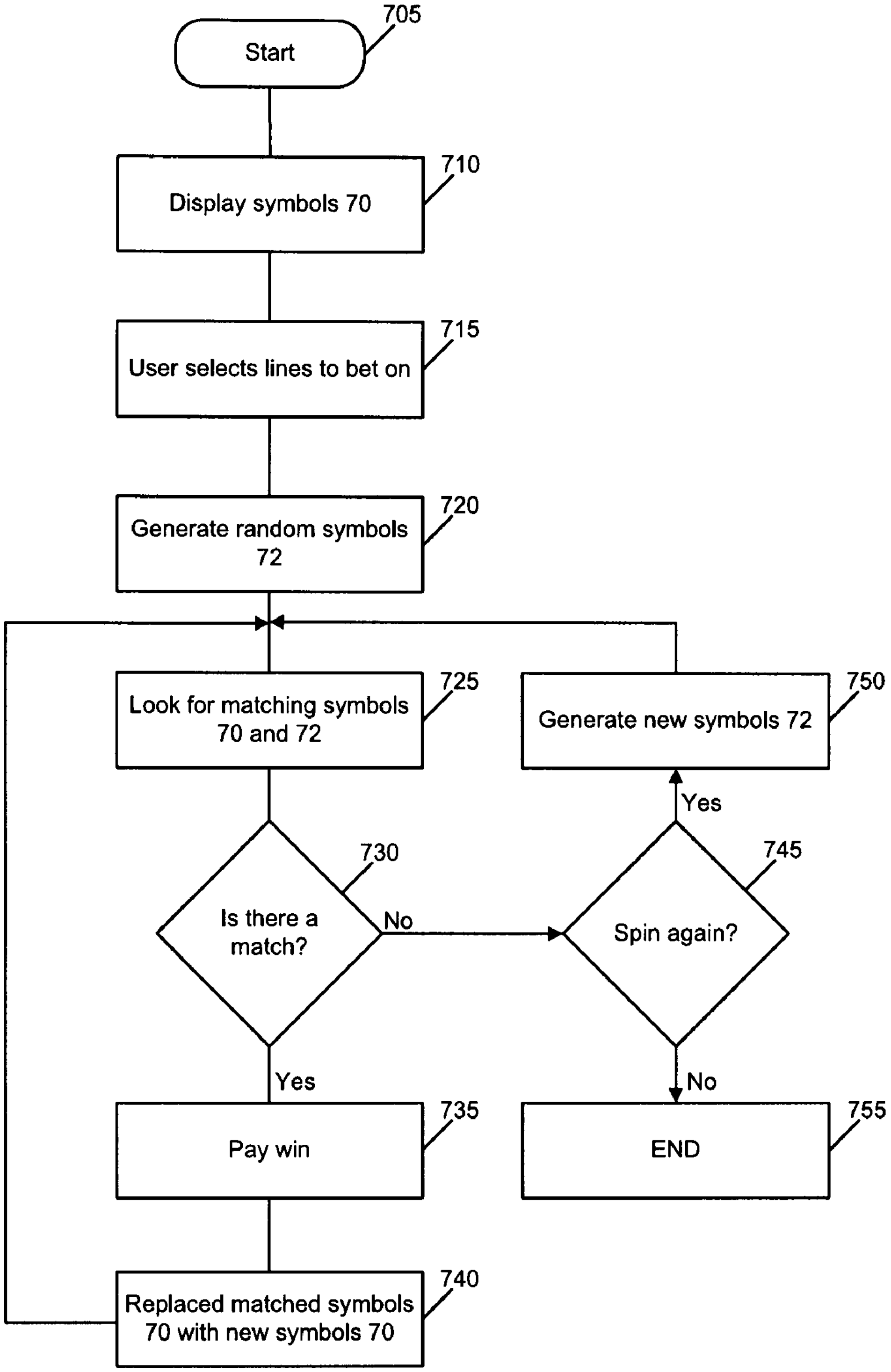
FIG. 17 is a flow chart explaining operation of an embodiment of the invention.

An embodiment of the invention is exemplified in FIGS. 6 to 76 and the flow chart forming FIG. 17.

In FIG. 6 there is no matching sequence of symbols in the rows 71*a* to 71*c* of the symbols 72, and the band 70. Thus, there is no win in relation to the "spin" shown in FIG. 6.

The player may therefore make a further spin in which the reels 72*a* to 72*e* are "rotated" so that a new array of second symbols 72 is displayed—i.e. a further set of symbols is selected for display. Such an array is shown in FIG. 8.

Figure 8:
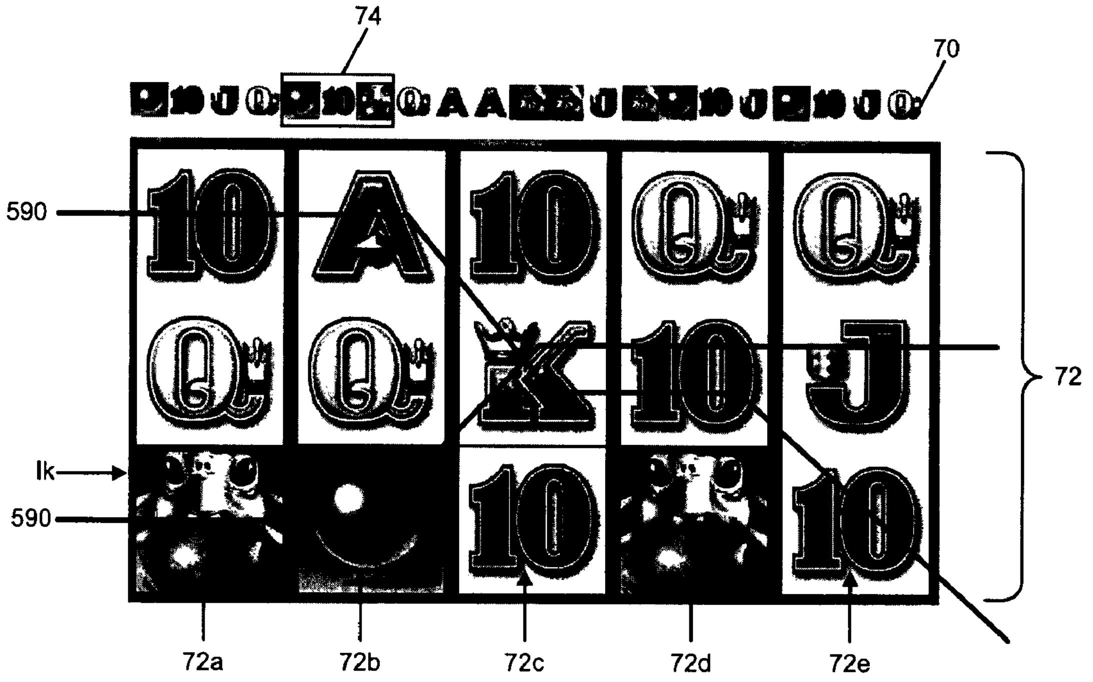
FIGS. 8 and 9 are views of displays illustrating the game according to an embodiment.

In the embodiment of FIG. 8, a match between the band 70 and the symbols 72 occurs as shown by the sequence of symbols labelled 74 in FIG. 8 which matches the turtle, ball and 70 symbols in row 71*c*. A payout of two credits therefore applies.

Figure 9:
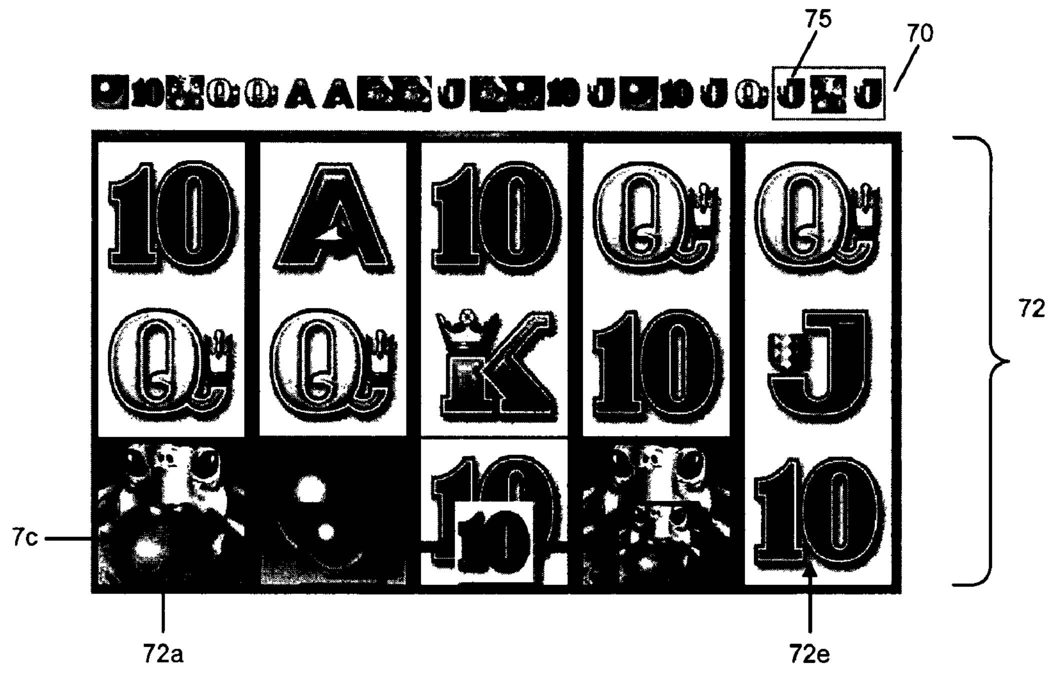

The sequence of symbols 74 shown in FIG. 8 is then removed from the band 70 and replaced by new symbols 75 shown in FIG. 9. In this embodiment, a new match of symbols is then looked for with the three new symbols 75 producing the possibility of further matches as does the removal of the sequence of symbols 74 from the band 70. If a new match is found, the payout is provided and the match symbols in the band 70 are removed and replaced by new symbols. If there was no match or no match after the replacement, then the player has the option of spinning again to provide a new random array of second symbols 72. Alternatively, if the game is implemented in a feature game involving free spins, the gaming machine may proceed directly to the next spin. In another embodiment, matches may not be re-evaluated until there is a further spin of the reels.

In the embodiment described, the new symbols are added by adding the symbols to the end of the band. This increases the prospects of a new match because those symbols themselves provide ability for a match as does the removal of the symbols 74 from the band. However, the new symbols 75 could merely be inserted in place of the removed symbols 74 in other embodiments.

Figure 10:
FIGS. 10, 11, 12, 13, 14 and 15 are diagrams illustrating displays to further explain an embodiment of the invention.
Figure 11:
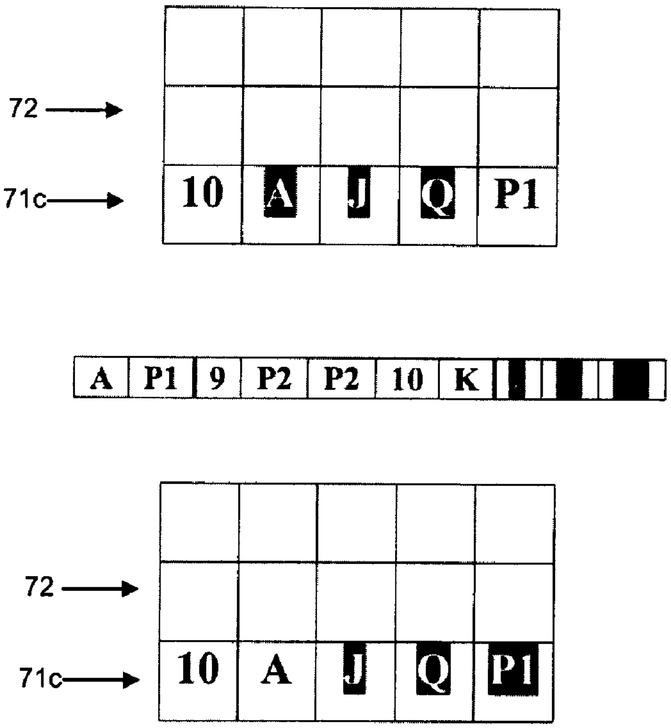
Figure 12:
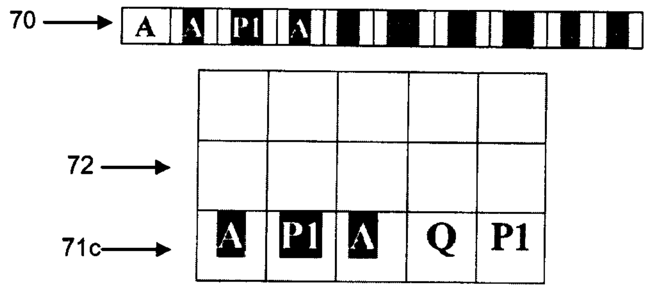

FIG. 10 shows a further example in which the band 70 includes the symbols Ace, Jack, Queen which match the corresponding symbols on row 71*c* of the plurality of symbols 72. After the payout, the Ace, Jack, Queen configured 70 is removed from the band 70 and replaced at the end of the row by new symbols Jack, Queen, P1 as shown in FIG. 71. This provides a new match in the display 72 by virtue of the symbols Jack, Queen, P1 again in reel 72*c*.

Figure 13:
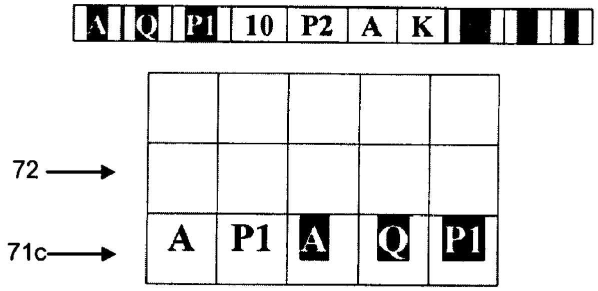

A further example is shown in FIG. 72 in which the band 70 contains the sequence Ace, P1, Ace which again has a match in row 71*c* of the symbols 72. The symbols Ace, P1, Ace are then removed from band 70 and replaced at the end of the row by new symbols, P3, Ace, Jack as shown in FIG. 13. This creates a new match Ace, Queen, P1 in row 71*c* of the symbols 72.

Figure 14:
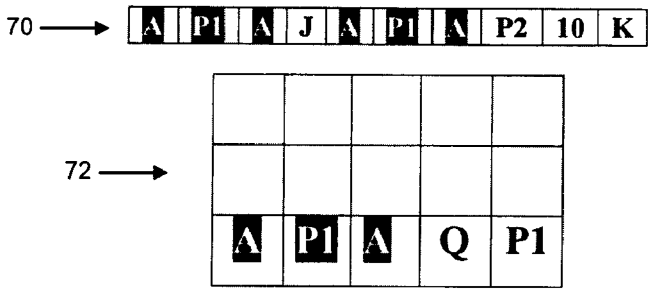

In the example of FIG. 14, there are two occurrences of the matching sequence in band 70 and group of symbols 72 as shown by the symbols Ace, P1, Ace. Thus, in this example, two lots of two winning units are paid out.

Figure 15:
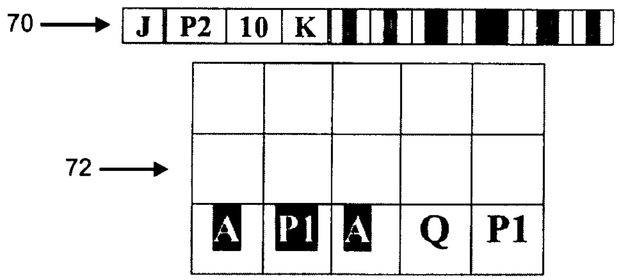

FIG. 15 shows the band 70 after the winning symbols are removed from the band 70 showing FIG. 14. In this embodiment, there is no match of symbols and therefore the player has the opportunity to roll again to cause the reels 72*a* to 72*e* to spin so that a new band of selection of symbols is displayed on the reels 72*a* to 72*c* to form the second plurality of symbols 72.

Persons skilled in the art will appreciate that first symbols 70 do not have to be displayed as a band but that doing so advantageously makes it easy to identify the existence of a match. Persons skilled in the art will appreciate some of the first symbols may be replaced between spins, for example by shifting the band left by three symbols and adding three new symbols at the end. Alternatively, some of the symbols may only be replaced when there is no match based on the existing first symbols. In a further example, the size of the band may vary based on certain factors, for example the amount bet. In a still further example, the band may grow or shrink based on when the player last achieved a match.

Persons skilled in the art will appreciate that in some embodiments the player may be required to operate touch screen and/or buttons 107 to confirm the existence of the match.

In various embodiments of the invention, the user may be able to insert a number of coins or other payment to enable any number of new spins of the reels 72*a* to 72*c* to bring up a new group of symbols 72. Furthermore, the game may be so arranged that the user can select to bet only on matches one of the row 71*a*, 71*b*, 71*c*, two of those rows, or all of the rows at the one time.

Figure 16:
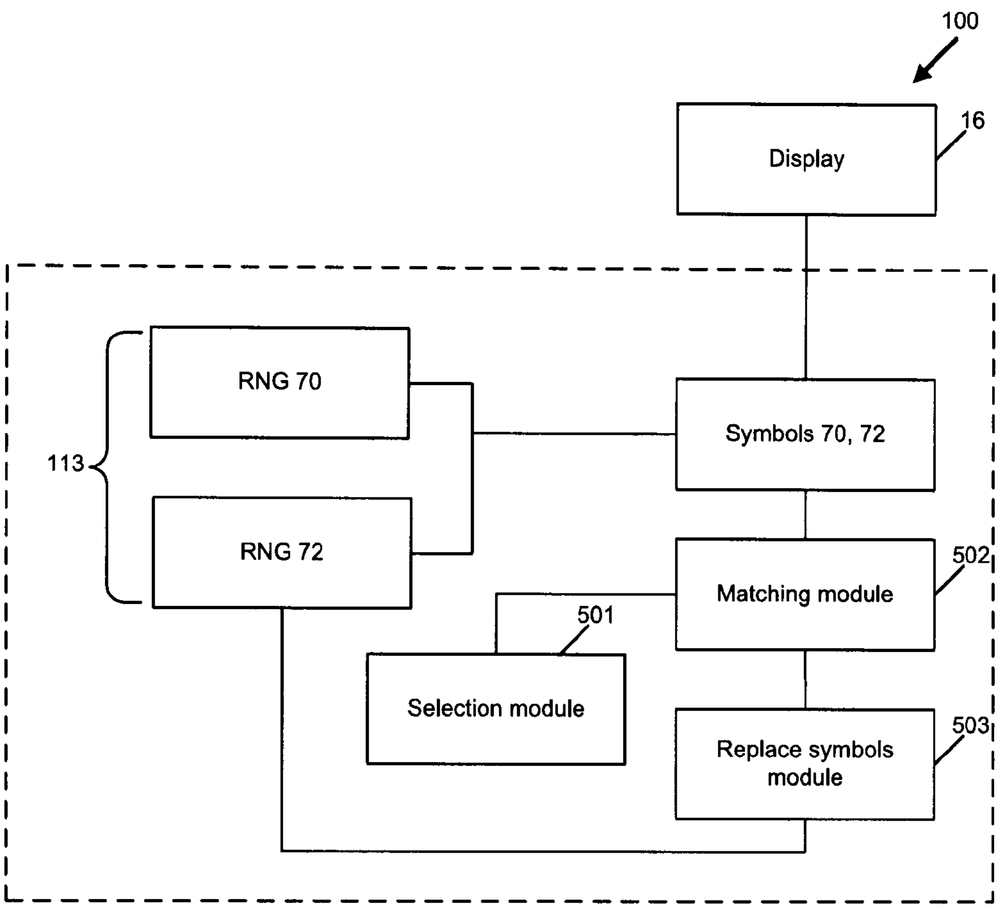
FIG. 16 is a functional schematic block module diagram relating to an embodiment of the invention.

FIG. 16 is a block module diagram of the controller 101 applicable to the embodiment of the invention. The controller 101 has random number generator 113 employed in order to generate the symbols 70 and 72. However, the symbols 70 could be generated and displayed by a separate device such as a player tracking module (not shown). That is, the matching game could be played on a separate device to the spinning reel game. Typically in order to generate the first symbols, the first symbols are stored in memory and are assigned a number or a range of numbers. The random number generator generates first numbers and the symbols associated with those numbers form the randomly generated symbols 70 Second symbols are selected conventionally for a spinning reel type game as described above. The first symbols are displayed by a graphic display driver which can also cause the second symbols to move in sequence downwardly in the reels 72 *a* to 72*e* of FIG. 6 for example to give the appearance of spinning reels and then are stopped one reel at a time. In one embodiment, a selection module 501 is provided by buttons and/or touch screen 107 for enabling the user to select whether the user wishes to play all three rows, two rows or just one row which may affect the size of the bet the player needs to make. Alternatively, the module 501 allows the player to select win lines in a conventional manner which may be lines 590 (FIG. 6) covering multiple rows and the matching game is evaluated on each row independently of which win lines are selected. In some games up to 50 or more win lines can be selected. The matching module 502 looks for a match between the symbols 70 and 72 in accordance with the rules of the game stored in memory 103, for example, three symbols in sequence in the band 70 and the same three symbols in sequence in one of the rows 71*a* to 71*e*. A symbol replacement module 503 removes the matched symbols from the symbols 72 and replaces those symbols with new symbols selected under control of the random number generator 113. The matching rules may vary depending on the symbols, for example rare symbols may only require a single symbol for a match to occur.

The first symbols may be drawn from a set that includes all the possible second symbols or may be a subset of those symbols. Rules may control how many of the symbols can be selected. In some embodiments, each of the first symbols may be predetermined, for example, there may be a predefined sequence of symbols.

Figure 18:
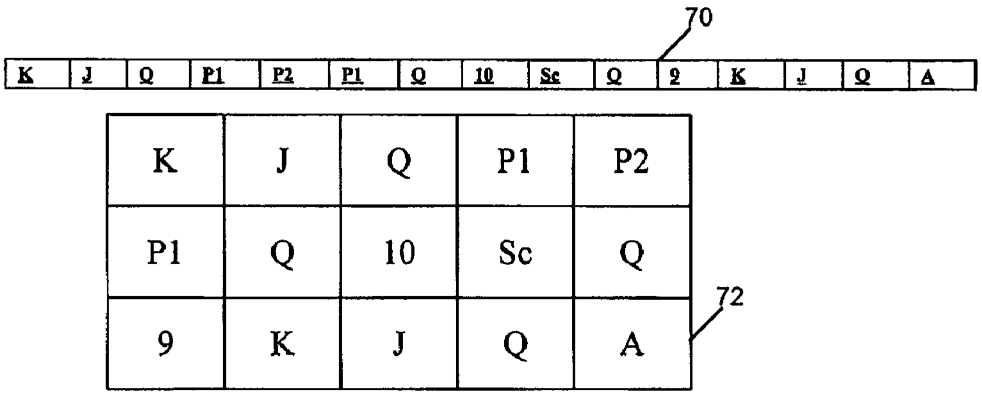
FIG. 18 is a diagram illustrating a display of a further example.

FIG. 18 shows a further example where matches may occur across rows of second symbols. That is, there is a defined sequence of the display positions that make up the three rows such that the last symbol of the first row (here P2) is followed by the first symbol of the second row (P1) and the last symbol of the second row (Q) connects to the first symbol of the second row (9). While allowing more matching possibilities of the type describe above, this also allows matching combinations of more than five symbols. In the example illustrated in FIG. 18 all 15 symbols match which can be used to award a large prize such as a progressive jackpot.

Figure 19:
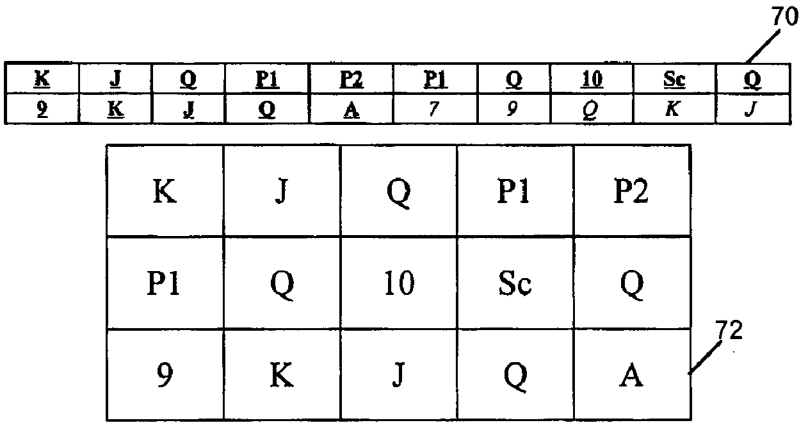
FIG. 19 is a diagram illustrating a display of a further example.

FIG. 19 shows a further example where there is greater number of first symbols 70 arranged across two rows to increase the chance of a match. In a further example, there could be a plurality of sets of first symbols 70 which are evaluated separately. The number of sets could be varied based on the amount bet or another criteria.

It will be understood to persons skilled in the art of the invention that many modifications may be made without departing from the spirit and scope of the invention, in particular it will be apparent that certain features of embodiments of the invention can be employed to form further embodiments.

In the claims which follow and in the preceding description of the invention, except where the context indicates otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Method steps associated with certain embodiments may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represents examples of corresponding acts for implementing the functions described in such steps.

The invention claimed is:

1. A method of gaming comprising:

(a) selecting, using a processor, a plurality of first symbols from a first symbol set and arranging, the selected first symbols row on a display;

(b) selecting, using the processor, a plurality of second symbols from a second symbol set and arranging the selected second symbols in an array of symbols comprising a plurality of rows and a plurality of columns on the display, wherein the first symbol set is different from the second symbol set;

(c) matching, using a processor, at least one of the first symbols selected from the first symbol set to at least one of the second symbols selected from the second symbol set;

(d) removing each first symbol which is matched with the second symbols; and (e) replacing, using a processor, each removed first symbol with an additional first symbol to thereby display a modified plurality of first symbols.

2. A method as claimed in claim 1 comprising repeating (c), (d) and (e) until there are no further matches.

3. A method as claimed in claim 1, comprising:

(f) displaying a further plurality of second symbols; and (g) repeating (c), (d) and (e) in respect of the further plurality of second symbols with the modified plurality of first symbols.

4. A method as claimed in claim 1, wherein the first symbols are randomly generated.

5. A method as claimed in claim 1, wherein the first symbols are arranged as a band of symbols separate from the second symbols.

6. A method as claimed in claim 1, wherein the second symbols are randomly generated.

7. A method as claimed in claim 1, wherein each second symbol corresponds to one of a plurality of reels.

8. A method as claimed in claim 1, wherein at least three of the first symbols are matched with at least three of the second symbols before symbols are removed.

9. A method as claimed in claim 1, wherein each match corresponds to a win.

10. A method as claimed in claim 1, wherein the matching of the first and second symbols comprises matching a number of the first symbols in sequence order with a number of the second symbols in sequence order.

11. A method as claimed in claim 10 wherein different winning ranges are provided for matching different numbers of first symbols with corresponding numbers of second symbols.

12. A method as claimed in claim 1, wherein the determination of a match is automatically assessed.

13. A method as claimed in claim 1, wherein player interaction to identify the matching symbols is required in order to identify a match.

14. A method as claimed in claim 1, wherein the second symbols are arranged in a plurality of rows and the step of matching is applied within each row.

15. A method as claimed in claim 1, wherein the second symbols are displayed at a plurality of display positions arranged in a plurality of rows and an order of display positions is defined, and wherein the matching is applied based on the order of the display positions such that matching can occur across rows.

16. A game controller for a gaming system, the game controller including a processor and a memory arranged to:

(a) select a plurality of first symbols from a first symbol set and arranging, the selected first symbols row on a display;

(b) select a plurality of second symbols from a second symbol set and arranging the selected second symbols in an array of symbols comprising a plurality of rows and a plurality of columns on the display, wherein the first symbol set is different from the second symbol set;

(c) match at least one of the first symbols selected from the first symbol set to at least one of the second symbols selected from the second symbol set;

(d) remove each first symbol which is matched with the second symbols; and (e) replace each removed first symbol with an additional first symbol to thereby display a modified plurality of first symbols.

17. A game controller as claimed in claim 16, arranged to repeat (c), (d) and (e) until there are no further matches.

18. A game controller as claimed in claim 16, arranged to:

(f) display a further plurality of second symbols; and (g) repeat (c), (d) and (e) in respect of the further plurality of second symbols with the modified plurality of first symbols.

19. A game controller as claimed in claim 16, comprising a random number generator.

20. A game controller as claimed in claim 19, arranged to randomly generate the first symbols with the random number generator.

21. A game controller as claimed in claim 19, arranged to randomly generate the second symbols with the random number generator.

22. A game controller as claimed in claim 16, wherein the first symbols are arranged as a band of symbols separate from the second symbols.

23. A game controller as claimed in claim 16, wherein each second symbol corresponds to one of a plurality of reels.

24. A game controller as claimed in claim 16, wherein at least three of the first symbols are matched with at least three of the second symbols before symbols are removed.

25. A game controller as claimed in claim 16, wherein each match corresponds to a win.

26. A game controller as claimed in claim 16, wherein the matching of the first and second symbols comprises matching a number of the first symbols in sequence order with a number of the second symbols in sequence order.

27. A game controller as claimed in claim 26, wherein different winning ranges are provided for matching different numbers of first symbols with corresponding numbers of second symbols.

28. A game controller as claimed in claim 16, wherein the determination of a match is automatically assessed.

29. A game controller as claimed in claim 16, wherein player interaction to identify the matching symbols is required in order to identify a match.

30. A game controller as claimed in claim 16, wherein the second symbols are arranged in a plurality of rows and the game controller is arranged to apply matching within each row.

31. A game controller as claimed in claim 16, wherein the second symbols are displayed at a plurality of display positions arranged in a plurality of rows and an order of display positions is defined, and wherein the game controller is arranged to apply matching based on the order of the display positions such that matching can occur across rows.

32. A game controller as claimed in claim 16, implemented, at least in part, by a processor executing program code stored in a memory.

33. A gaming system comprising:

a player interface comprising a display; and a gaming controller arranged to:

(a) select a plurality of first symbols from a first symbol set and arranging, the selected first symbols row on a display;

(b) select a plurality of second symbols from a second symbol set and arranging the selected second symbols in an array of symbols comprising a plurality of rows and a plurality of columns on the display, wherein the first symbol set is different from the second symbol set;

(c) match at least one of the first symbols selected from the first symbol set to at least one of the second symbols selected from the second symbol set;

(d) remove each first symbol which is matched with the second symbols; and (e) replace each removed first symbol with an additional first symbol to thereby display a modified plurality of first symbols on the display.

34. A gaming system as claimed in claim 33, wherein the game controller is arranged to repeat (c), (d) and (e) until there are no further matches.

35. A gaming system as claimed in claim 33, wherein the game controller is arranged to:

(f) display a further plurality of second symbols on the display; and (g) repeat (c), (d) and (e) in respect of the further plurality of second symbols with the modified plurality of first symbols.

36. A gaming system as claimed in claim 33, comprising a random number generator.

37. A gaming system as claimed in claim 36, wherein the game controller is arranged to randomly generate the first symbols with the random number generator.

38. A gaming system as claimed in claim 36, wherein the game controller is arranged to randomly generate the second symbols with the random number generator.

39. A gaming system as claimed in claim 33, wherein the first symbols are arranged on the display as a band of symbols separate from the second symbols.

40. A gaming system as claimed in claim 33, wherein each second symbol corresponds to one of a plurality of reels displayed on the display.

41. A gaming system as claimed in claim 33, wherein at least three of the first symbols are matched with at least three of the second symbols before symbols are removed.

42. A gaming system as claimed in claim 33, wherein each match corresponds to a win.

43. A gaming system as claimed in claim 33, wherein the matching of the first and second symbols comprises matching a number of the first symbols in sequence order with a number of the second symbols in sequence order.

44. A gaming system as claimed in claim 43, wherein different winning ranges are provided for matching different numbers of first symbols with corresponding numbers of second symbols.

45. A gaming system as claimed in claim 33, wherein the determination of a match is automatically assessed.

46. A gaming system as claimed in claim 33, wherein the player interface comprises an instruction input mechanism and the player is required to operate the instruction input mechanism to identify the matching symbols.

47. A gaming system as claimed in claim 33, wherein the second symbols are arranged in a plurality of rows on the display and the game controller is arranged to apply matching within each row.

48. A gaming system as claimed in claim 33, wherein the second symbols are displayed at a plurality of display positions arranged in a plurality of rows and an order of display positions is defined, and wherein the game controller is arranged to apply matching based on the order of the display positions such that matching can occur across rows.

49. A gaming system as claimed in claim 33, comprising a processor and a memory storing program code which when executed implements the game controller.

50. A tangible computer readable storage medium including computer program code which, when executed implements a method of gaming, said method comprising:

(a) selecting, using a processor, a plurality of first symbols from a first symbol set and arranging, the selected first symbols row on a display;

(b) selecting, using the processor, a plurality of second symbols from a second symbol set and arranging the selected second symbols in an array of symbols comprising a plurality of rows and a plurality of columns on the display, wherein the first symbol set is different from the second symbol set;

(c) matching, using a processor, at least one of the first symbols selected from the first symbol set to at least one of the second symbols selected from the second symbol set;

(d) removing each first symbol which is matched with the second symbols; and (e) replacing each removed first symbol with an additional first symbol to thereby display a modified plurality of first symbols.

* * * * *